INVENTOR
Peter Lackner

BY Spencer & Kaye
ATTORNEYS

Oct. 7, 1969 P. LACKNER 3,471,812

HIGH IMPEDANCE PRINTED CONDUCTOR CIRCUIT SUITABLE FOR HIGH FREQUENCIES

Filed Sept. 2, 1965 2 Sheets-Sheet 2

INVENTOR

Peter Lackner

BY Spencer & Kaye

ATTORNEYS

United States Patent Office 3,471,812

Patented Oct. 7, 1969

3,471,812

HIGH IMPEDANCE PRINTED CONDUCTOR CIRCUIT SUITABLE FOR HIGH FREQUENCIES

Peter Lackner, Heilbronn, Germany, assignor to Telefunken Patentverwertungsgesellschaft m.b.H., Ulm (Danube), Germany Filed Sept. 2, 1965, Ser. No. 484,644
Claims priority, application Germany, Sept. 2, 1964, T 26,925
Int. Cl. H01p 3/08
U.S. Cl. 333—84 17 Claims

ABSTRACT OF THE DISCLOSURE

A printed conductor circuit, suitable for use with high frequencies, which exhibits a high characteristic impedance. The circuit includes a thin plate of low-loss dielectric material having first and second layers of conductive material respectively disposed on its opposite faces. A portion of the first conductive layer is removed down to its associated plate face to form an inner conductor within, and an outer conductor without, the removed portion, and the outer conductor part of the first conductive layer is electrically connected to the second layer. The dimensions and arrangement of the inner conductor thus determine the characteristic impedance of the circuit.

The present invention relates to circuits, and particularly to conductor circuits for use in communication devices.

In the construction of a certain class of conductor circuits for use with high frequency signals, it is known to form an inner conductor on a plastic plate which is common to several conductor circuits by means of any one of the various printing techniques such as etching, vacuum deposition, printing, etc., and to insert the resulting plastic plate into a suitable tank circuit. In such arrangements the dimensions and the positioning of the inner conductor are a measure of the magnitude of the characteristic impedance of the entire conductor circuit.

It should be noted that the terms "inner conductor" and "outer conductor," as used throughout this specification, are intended to indicate the respective conductors which historically were constructed in coaxial configuration. That is, the inner conductor, as used here is equivalent to the center lead, and the outer conductor equivalent to the shield, in a coaxial conductor circuit.

It is also known in the art to provide an output from an inner conductor of the printed type by arranging a "coupling loop" in the vicinity of the inner conductor and connecting this loop to the following stage. The position and configuration of this coupling loop are very critical, however, since they determine the degree of coupling between loop and inner conductor for the range of frequencies at which the circuit is operated.

When a printed conductor circuit is employed with a tuned or tunable circuit the impedance of the conductor circuit is necessarily strongly determinative of the impedance of the entire resonant circuit. Since a high degree of damping is desirable for certain resonant circuits, such as those employed in television tuners, it is desirable to construct the printed conductor circuit to have a high "resonance resistance"; i.e., a high resistance when the resonant circuit is at resonance. Since it is also advantageous to construct such a resonant circuit with a high quality factor or "Q" (which equals the ratio of the inductance or capacitance to the resistance at resonance) it is desirable, in addition, to make the characteristic impedance of the conductor circuit as high as possible.

Now, there is a theoretical value of characteristic impedance for a printed conductor circuit which can never be achieved in practice. But it is the purpose of the present invention to construct this type of circuit to have a characteristic impedance which comes as close to this theoretical value as possible.

It is, therefore, an object of the present invention to make the characteristic impedance of a printed conductor circuit as large as possible.

It is a further object of this invention to provide a simple conductor circuit of this type which exhibits a high resonance resistance and, when the circuit is to be tuned by varying a capacitance, which exhibits a high quality factor.

It is yet another object of the present invention to permit such a circuit to be tuned in a simple manner.

These objects are achieved, according to the present invention, by the provision of a circuit composed of a thin plate of a low-loss dielectric material, having a pair of opposed faces, and a layer of conductive material disposed on each of the faces. A portion of the layer on one of the faces is removed to form an inner conductor leaving the conductive material surrounding the removed portion and the conductive material on the other face to constitute the outer conductor for the device. The dimensions and arrangement of the inner conductor will thus determine the characteristic impedance of the circuit.

A coupling loop is additionally provided adjacent the inner conductor by a similar removal of a portion of the remaining metal layer on the face carrying the inner conductor.

According to the present invention, a portion of the layer on the other side of the dielectric is also removed in the region opposite the inner conductor, and means are provided for varying the size of this removed portion, in the region of the coupling loop, in order to vary the degree of coupling, and for varying the size of this portion, in a region removed from the coupling loop, in order to tune the circuit. These variations are preferably accomplished through the use of movable covers which can be directly connected to the metal layer on the side opposite the inner conductor (and thus be coupled thereto for all frequencies) or be connected to this metal layer via a dielectric (and be coupled for high frequencies only).

Additional objects and advantages of the present invention will become apparent upon consideration of the following description when taken in conjunction with the accompanying drawings in which:

FIGURE 1 is a perspective view of a preferred form of conductor used in the practice of the present invention.

FIGURES 2*a* and 2*b* are top and bottom views, respectively, of the unit shown in FIGURE 1.

FIGURE 2*c* is a bottom view showing a modified version of the unit of FIGURES 2*a* and 2*b*.

Figure 1:
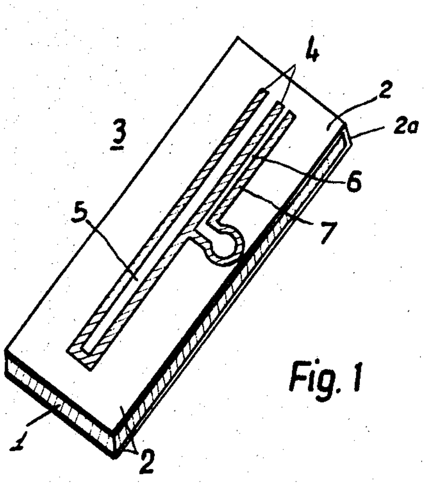

Referring first to FIGURE 1, there is shown a thin plastic plate 1 made of a low-loss dielectric such as the plastic material sold under the trademark Teflon, for example. The plastic plate 1 is coated on each side with a thin layer of conducting metal and these two layers are connected together by a bridge 2*a*. The main portion of the layer appearing on the top surface of the unit thus formed, which corresponds with the surface which is visible in FIGURE 1, constitutes a portion of the outer conductor 2 of the conductor circuit 3, the metal layer on the lower surface of the unit constituting the remaining portion of the outer conductor. The top surface metal layer is then removed along the U-shaped portion 4 by any well-known technique such as etching, for example, in order to create an inner conductor 5 whose length, for example, is equal to $\lambda/4$ for the lowest signal frequency with which the circuit 3 is to operate. It is desirable to make wide the removed portion 4 so as to maintain the capacitance between inner conductor 5 and the outer conductor, formed by the main portion of layer 2, as small as possible in order to create as high a characteristic impedance as possible; however, it is also desirable to make the removed portion narrow in order to cause the electric field associated with the conductors to extend within the dielectric 1. Since the first-mentioned requirement is inconsistent with the second, a compromise must be made to produce a satisfactory unit. In a preferred embodiment of the present invention the width of the portion 4 was accordingly made equal to the thickness of the dielectric plate 1. The circuit 3 is also furnished with a coupling loop 6 adjacent the inner conductor 5 by the removal of conducting material from the top surface metal layer along the portion 7. The width of the portion 7 must also be chosen to satisfy the above mentioned requirements. The distance of the coupling loop 6 from the inner conductor 5 determines the degree of coupling between these two elements. Preferably, the coupling loop is arranged to provide a mixed inductive and capacitive coupling. For this purpose the distance between the coupling loop 6 and the inner conductor 5 should be chosen to be as small as possible, while the distance between the coupling loop 6 and the outer conductor should be chosen to be as large as possible. In FIGURE 1 the coupling loop is shown in a position approximately between the inner conductor 5 and the outer conductor 2, while in FIGURE 3 the coupling loop is arranged closer to the inner conductor. Since the degree of coupling between the loop 6 and the inner conductor 5 varies with the signal frequency, the coupling loop is formed so as to be close to the inner conductor along the region thereof which is penetrated by the higher signal frequencies. This arrangement will then partially compensate for the greater leakage at these higher frequencies by providing greater coupling. The remainder of the coupling loop is bent away from the inner conductor at a certain point so that it will extend along but at a relatively greater distance from, the portion of the inner conductor which is penetrated by only the lower frequencies within the tunable band. Because of the compromise which must be made when dimensioning the portion 4, the characteristic impedance of the conductor circuit can not be further increased in the region where the coupling loop is bent away from the inner conductor.

Figure 2A:
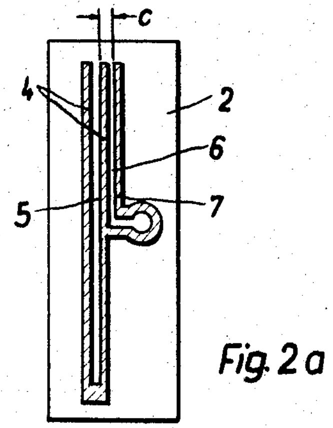
Figure 2B:
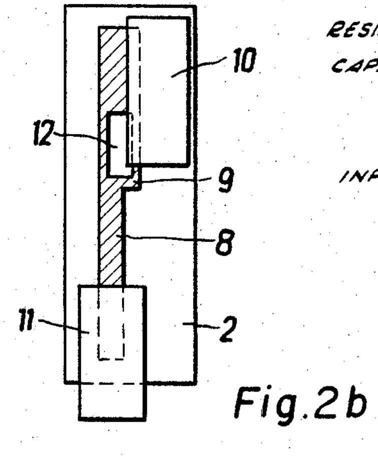

FIGURE 2*a* shows the top surface of the unit illusterated in FIGURE 1, while FIGURE 2*b* shows the bottom surface thereof provided with an arrangement for further increasing the characteristic impedance of the circuit 3. To this end, a portion 8 is removed from the metal layer placed on the bottom surface of plate 1, which is the surface opposite that on which the arrangement of FIGURE 1 is formed. The portion 8 is disposed substantially opposite the inner conductor 5. The broken lines in FIGURE 2*b* are provided in order to show completely the extent of portion 8. The removal of the metal layer in the portion 8 serves to further diminish the capacitance between the inner conductor 5 and the outer conductor 2, without permitting the field created between these two conductors to emerge from the dielectric to any appreciable degree. The portion 8 is widened in the region opposite the coupling loop 6 by a projection 9 which serves to create a tighter coupling between the conductor 5 and the loop 6 in this region. FIGURE 2*b* also shows two removable conductively connected covers 10 and 11, which are provided to permit a variation in the dimensions of the portion 8. The placement of cover 10, which is made of conducting material, permits the degree of coupling to be varied, while the placement of the cover 11, which is also of conductive material and which is located beyond the range of the coupling loop 6, permits the circuit to be tuned to different resonant frequencies. The covers 10 and 11 are electrically connected to the layer on the bottom of plate 1 in such a way that the coupling will be high only for high frequencies; for example, they can be attached to this layer with a non-conductive cement. These covers can also be attached in a movable manner, e.g., by means of tracks or by pivotable connections. The coupling between the loop 6 and the inner conductor 5 can also be adjusted by the provision of an additional member 12 which is electrically isolated from the layer on the bottom surface of plate 1.

Figure 2C:
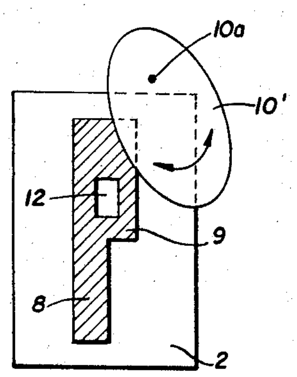

FIGURE 2*c* is a bottom view showing a modification of the above-described unit in which a cover 10′, which is pivotably mounted to rotate about a pivot 10*a* attached to a suitable support surface, replaces the slidable cover 10. Cover 10′ performs the same function as cover 10.

Figure 3:
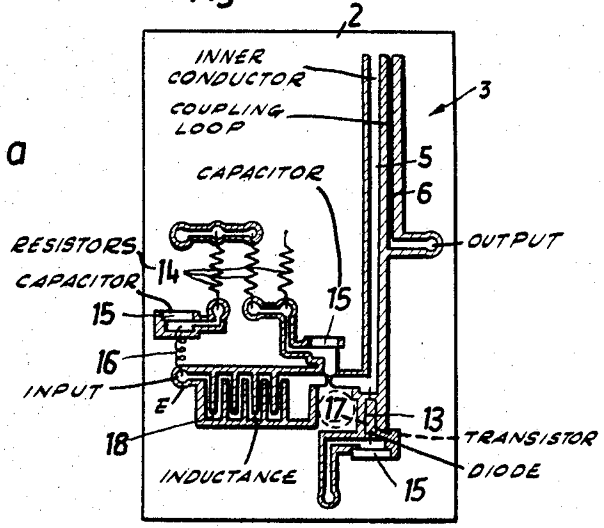
FIGURE 3 is a top view of a preferred embodiment of the present invention utilizing the unit shown in FIGURES 1 and 2.

Referring now to FIGURE 3, there is shown a top view of a circuit embodiment of the device already described. The circuit comprises, in addition to the circuit 3, a capacitive tuning diode 13 which is connected to one end of the inner conductor 5 for purposes of tuning the circuit 3. Various conductor paths associated with the circuit shown in FIGURE 3 are formed by the removal of portions of the metal layer in a region which is sufficiently far away from the circuit 3 to insure that the removal of these portions of the conductive layer will not change the characteristic impedance of the circuit 3. The plate 1 serves as the carrier plate for various components associated with the circuit, such as resistors 14; disc capacitors 15 arranged vertically in slots in the plate; a choke coil 16; and a transistor 17 arranged, as shown by the dashed lines, on the opposite side of the plate. In addition, an inductance 18 is provided by the removal of a supplemental portion of the metal layer. The separation between the inductance 18 and the remainder of the layer is so dimensioned that a capacitance is created between the inductance and the conductive layer on the other side of the plate which combines with this inductance to constitute a matching four-terminal network; i.e., the network formed by the input and output terminals of the inductance and the "ground" formed by the conductive layer. In order to decrease the capacitance between inductance 18 and the outer conductor 2 a portion of the layer on the bottom of the device (not visible) is removed in the region opposite inductance 18. This portion can be partially covered by a cover similar to those shown in FIGURE 2*b* in order to vary the relationship between the inductance and capacitance and, thus, the mutual inductance property of the inductance 18. This cover is connected to the conductive layer on the bottom of the unit only with respect to high frequencies.

In accordance with one preferred use of the conductor circuit according to the present invention, the input E to the four-terminal network constituted by the inductance 18 may be connected to a $\lambda/2$ phasing line (not shown) which is to be coupled to a symmetrical line. The phasing line is preferably formed by the removal of a suitable portion of material from the metal layer, or is separately printed onto the plate 1. An antenna (not shown) is preferably printed on the plate 1, in addition, and is connected to the inductance 18, in the case of asymmetrical construction, or to a balanced four-terminal network (not shown), in the case of symmetrical construction. The resulting device is suitable for incorporation or subsequent insertion in television sets which are to be operated without the aid of roof antennas and without antenna lines. Preferably, the plate is inserted in a plastic housing which is given a metallic coating in order to serve as a shielding device and as a part of the antenna.

If it is desired to employ a plurality of conductor circuits, it is preferable to form the circuits to have a common outer conductor and to form the inner conductors and coupling loop by removing suitable portions of conductive material from the layer forming this outer conductor. In this case, the spacings between the several inner conductors can be made relatively small. The arrangement described above is suitable for use in all types of UHF systems such as, e.g. antenna amplifiers, UHF tuners for television sets, etc.

Figure 4:
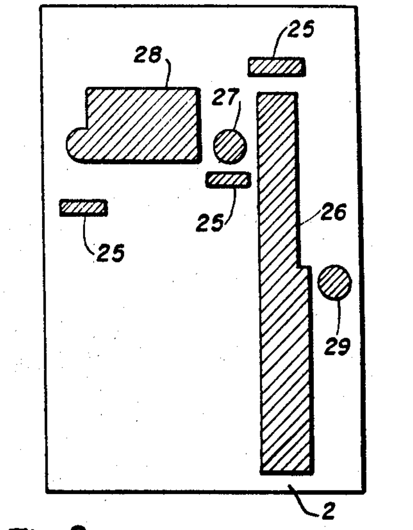
FIGURE 4 is a bottom view of the unit of FIGURE 3.

FIGURE 4 is a bottom view of the device of FIGURE 3 showing various portions of the bottom metal layer removed in order to further diminish the effective capacitance between certain components and outer conductor 2. Thus, portions 25 are removed to reduce the capacitance between capacitors 15 and conductor 2, portion 26 is removed to reduce the capacitance between conductor 2 and both inner conductor 5 and loop 6, removed portion 27 reduces the capacitance associated with transistor 17, removed portion 28 reduces that associated with inductance 18, and removed portion 29 reduces that associated with the output terminal of loop 6, which also serves as the signal output terminal for the circuit.

Figure 5:
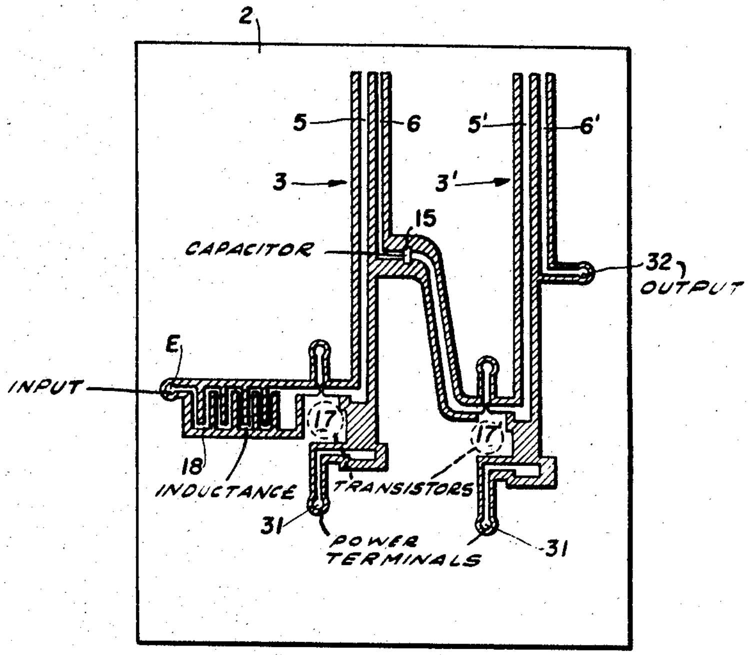
FIGURE 5 is a top view of another circuit utilizing the unit of FIGURES 1 and 2.

Turning now to FIGURE 5, there is shown the basic structure for a more complex circuit utilizing two circuits 3 coupled in cascade. The lumped parameter elements to be connected to this circuit have been omitted from the drawing for purposes of clarity. The circuit comprises an inductance 18 having a signal input E at one end, the other end of the inductance being connected to one electrode of a transistor 17. Another electrode of this transistor is connected to the inner conductor 5 of a first tuned circuit 3 and the coupling loop of this circuit is connected to an electrode of a second transistor 17'. Another electrode of transistor 17' is connected to the inner conductor 5' of a second tuned circuit 3'. The coupling loop 6' terminates in a terminal 32 which serves as the output terminal for the device. Supply voltage terminals 31 are also provided. The bottom surface (not shown) may also have portions of its metal layer removed in a manner similar to that shown in FIGURE 4.

It will be understood that the above description of the present invention is susceptible to various modifications, changes, and adaptations, and the same are intended to be comprehended within the meaning and range of equivalents of the appended claims.

What is claimed is:

1. A printed conductor circuit comprising:
(a) a thin plate of low-loss dielectric material having a pair of opposed faces;
(b) a layer of conductive material disposed on each of said faces; and
(c) means electrically connecting together said layers disposed on each of said faces;
(d) said layer on one of said faces having a portion removed down to the associated plate face to form an inner conductor defined by the removed portion, the conductive material surrounding the removed portion and the conductive material on the opposite one of said faces forming an outer conductor, the dimensions and arrangement of said inner conductor determining the characteristic impedance of said circuit, said layer on said one face having an additional portion removed down to its associated plate face to form a coupling loop of conductive material defined by the additional removed portion, said loop being disposed substantially adjacent said inner conductor.

2. An arrangement as defined in claim 1 wherein said loop is positioned to be both inductively and capacitively coupled with said inner conductor.

3. An arrangement as defined in claim 2 wherein said layer on said opposite one of said faces has a portion removed down to its associated plate face in a region opposite said inner conductor and said loop for increasing the degree of coupling between said inner conductor and said loop.

4. An arrangement as defined in claim 3 wherein the removed portion on said opposite one of said faces surrounds a conductive layer portion which is conductively isolated from said outer conductor and which constitutes a cover member for increasing the degree of capacitive coupling between said inner conductor and said loop.

5. An arrangement as defined in claim 4 further comprising first conductive cover means adjacent said plate for varying the effective size of said removed portion on said opposite one of said faces in the region opposite said inner conductor for tuning said circuit.

6. An arrangement as defined in claim 5 wherein said first cover means is mounted on the layer on said opposite one of said faces for movement parallel to said faces.

7. An arrangement as defined in claim 6 wherein said first cover means is mounted for rotation in a plane parallel to said faces.

8. An arrangement as defined in claim 6 wherein said first cover means and said outer conductor are coupled by means providing a low impedance connection therebetween only for high frequencies.

9. An arrangement as defined in claim 4 further comprising second conductive cover means adjacent said plate for varying the effective size of said removed portion on said opposite one of said faces in the region opposite said loop for varying the degree of coupling between said inner conductor and said loop.

10. An arrangement as defined in claim 9 wherein said second cover means is mounted on the layer on said opposite one of said faces for movement parallel to said faces.

11. An arrangement as defined in claim 10 wherein said second cover means is mounted for rotation in a plane parallel to said faces.

12. An arrangement as defined in claim 10 wherein said second cover means and said outer conductor are coupled by means providing a low impedance connection therebetween only for high frequencies.

13. A printed conductor circuit comprising:
(a) a thin plate of low-loss dielectric material having a pair of opposed faces;
(b) a layer of conductive material disposed on each of said faces; and
(c) means electrically connecting together said layers disposed on each of said faces;
(d) said layer on one of said faces having a portion removed down to the associated plate face to form an inner conductor defined by the removed portion, the conductive material surrounding the removed portion and the conductive material on the opposite one of said faces forming an outer conductor, the dimensions and arrangement of said inner conductor determining the characteristic impedance of said circuit said layer on said opposite one of said faces having a portion removed down to its associated plate face in a region opposite said inner conductor for causing the characteristic impedance to be as large as possible, thereby creating a high resonance resistance and high quality factor for the circuit.

14. A printed conductor circuit comprising:
(a) a thin plate of low-loss dielectric material having a pair of opposed faces;
(b) a layer of conductive material disposed on each of said faces; and
(c) means electrically connecting together said layers disposed on each of said faces;
(d) said layer on one of said faces having a portion removed down to the associated plate face to form an inner conductor defined by the removed portion, the conductive material surrounding the removed portion and the conductive material on the opposite one of said faces forming an outer conductor, the dimensions and arrangement of said inner conductor determining the characteristic impedance of said circuit, said layer on said one face having a plurality of additional portions thereof removed down to its associated plate face to form a plurality of additional inner conductors each of which is defined by a respective one of the additional removed portions.

15. A printed conductor circuit comprising:
(a) a thin plate of low-loss dielectric material having a pair of opposed faces;

(b) A layer of conductive material disposed on each of said faces; and (c) means electrically connecting together said layers disposed on each of said faces;

(d) said layer on one of said faces having a portion removed down to the associated plate face to form an inner conductor defined by the removed portion, the conductive material surrounding the removed portion and the conductive material on the opposite one of said faces forming an outer conductor, the dimensions and arrangement of said inner conductor determining the characteristic impedance of said circuit, said layer on said one of said faces having supplementary portions thereof removed down to its associated plate face for forming conductor paths for the connection of additional circuit elements to said inner and outer conductors.

16. An arrangement as defined in claim 15 wherein one of said supplementary removed portions defines an inductance which is separated from said outer conductor by such a distance that the capacitance existing between said inductance and said outer conductor combines with said inductance to constitute a four-terminal filter network.

17. An arrangement as defined in claim 16 wherein said layer on said opposite face has a further portion removed down to its associated plate face in the region opposite said inductance, said circuit further comprising third conductive cover means movably mounted adjacent said further removed portion for varying the relationship between the inductance and capacitance of said inductance, thereby to vary the mutual inductance properties thereof.

References Cited

UNITED STATES PATENTS

| | | | |
|---|---|---|---|
| 2,468,151 | 4/1949 | Willoughby. | |
| 2,751,589 | 6/1956 | Cary | 343—767 |
| 2,990,547 | 6/1961 | McDougal | 343—767 |
| 3,172,112 | 3/1965 | Seeley | 343—767 |
| 3,289,123 | 11/1966 | Bomhardt et al. | 334—45 X |
| 2,411,555 | 11/1946 | Rogers | 333—84 |
| 2,611,822 | 9/1952 | Bliss | 333—84 |
| 2,706,697 | 4/1955 | Eisler | 333—84 |
| 2,794,174 | 5/1957 | Arditi et al. | 333—84 |
| 2,896,177 | 7/1959 | Wilson | 333—84 |
| 2,897,460 | 7/1959 | La Rosa | 333—84 |
| 2,915,716 | 12/1959 | Hattersley | 333—84 |
| 2,922,123 | 1/1960 | Cohn | 333—84 |
| 2,925,568 | 2/1960 | Baldwin | 333—84 |
| 2,976,501 | 3/1961 | Mattiat | 333—32 |
| 3,177,453 | 4/1965 | Putzer | 333—84 |

FOREIGN PATENTS

| | | |
|---|---|---|
| 1,395,565 | 3/1965 | France. |
| 798,143 | 7/1958 | Great Britain. |

OTHER REFERENCES

Arditi, M., Characteristics and Applications of Microstrip for Microwave Wiring, IRE Transactions on Microwave Theory and Techniques, MTT-3, March 1955, No. 2, pp. 31–56.

HERMANN KARL SAALBACH, Primary Examiner

W. H. PUNTER, Assistant Examiner

U.S. Cl. X.R.

174—68.5; 333—33, 70, 73; 334—45